United States Patent
Gonon et al.

(10) Patent No.: US 9,211,505 B2
(45) Date of Patent: Dec. 15, 2015

(54) USE OF A FUNCTIONALIZED MINERAL FILLER FOR CHEMICALLY STABILIZING A POLYMER, MEMBRANE THUS STABILIZED, PROCESS FOR PREPARING SAME AND USES THEREOF

(75) Inventors: Laurent Gonon, Soucieu-en-Jarrest (FR); Vincent Mareau, Eybens (FR); Catherine Marestin, Saint Genis Laval (FR); Regis Mercier, Irigny (FR); Guillaume Monin, Grenoble (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITE JOSEPH FOURIER, Grenoble (FR)

( * ) Notice: Subject to any disclaimer, the term of this patent is extended or adjusted under 35 U.S.C. 154(b) by 201 days.

(21) Appl. No.: 13/819,942

(22) PCT Filed: Sep. 2, 2011

(86) PCT No.: PCT/EP2011/065239
§ 371 (c)(1),
(2), (4) Date: Feb. 28, 2013

(87) PCT Pub. No.: WO2012/028736
PCT Pub. Date: Mar. 8, 2012

(65) Prior Publication Data
US 2013/0164653 A1   Jun. 27, 2013

(30) Foreign Application Priority Data

Sep. 3, 2010 (FR) ...................................... 10 57030

(51) Int. Cl.
*H01M 8/10* (2006.01)
*B01D 69/14* (2006.01)
*C08K 5/548* (2006.01)

(52) U.S. Cl.
CPC ............ *B01D 69/141* (2013.01); *B01D 69/148* (2013.01); *C08K 5/548* (2013.01); *B01D 2325/24* (2013.01); *H01M 8/1018* (2013.01); *H01M 8/1041* (2013.01)

(58) Field of Classification Search
CPC .................. H01M 2300/0011; H01M 8/1018; H01M 8/1041
See application file for complete search history.

(56) References Cited

U.S. PATENT DOCUMENTS

| 4,153,661 | A | 5/1979 | Ree et al. |
| 2005/0053818 | A1 | 3/2005 | St-Arnaud et al. |
| 2005/0260478 | A1* | 11/2005 | Mino et al. .................. 429/34 |
| 2006/0083962 | A1 | 4/2006 | Takekawa et al. |
| 2012/0267248 | A1* | 10/2012 | Willis ......................... 204/632 |

OTHER PUBLICATIONS

Angelova, D., et al., "Sol-gel synthesis of Zn-thiourea-SiO2 thin films from (EtO)3Si(CH2)3NHC(=S)NHPh as molecular precursor", "Solid State Sciences", Sep. 17, 2004, pp. 1287-1294, vol. 6.
De, S., et al., "Antioxidant activity of an aminothiazole compound: Possible mechanisms", "Chemico-Biological Interactions", Mar. 26, 2008, pp. 215-223, vol. 173.
Gensler, R., et al., "Thermo-oxidative degradation of isotactic polypropylene at high temperatures: phenolic antioxidants versus HAS", "Polymer Degradation and Stability", 2000, pp. 195-208, vol. 67.
Mikhailenko, S., et al., "Properties of SPEEK based membranes modified with a free radical scavenger", "Journal of Membrane Science", Sep. 10, 2009, pp. 315-322, vol. 345.
Rhee, C., et al., "Nanocomposite membranes of surface-sufonated titanate and Nafion for direct methanol fuel cells", "Journal of Power Sources", Jan. 18, 2006, pp. 1015-1024, vol. 159.
Sen, U., et al., "Anhydrous proton conducting membranes for PEM fuel cells based on Nafion/Azole composites", "International Journal of Hydrogen Energy", 2008, pp. 2808-2815, vol. 33.
Xiao, S., et al., "Degradation location study of proton exchange membrane at open circuit operation", "Journal of Power Sources", Mar. 10, 2010, pp. 5305-5311, vol. 195.
Zhao, D., et al., "MnO2/SiO2-SO3H nanocomposite as hydrogen peroxide scavenger for durability improvement in proton exchange membranes", "Journal of Membrane Science", Sep. 20, 2009, pp. 143-151, vol. 346.

* cited by examiner

*Primary Examiner* — Jane Rhee
(74) *Attorney, Agent, or Firm* — Hultquist, PLLC; Mary B. Grant

(57) ABSTRACT

The present invention concerns the use of at least one mineral filler functionalized by at least one group comprising at least one sulfur atom for chemically stabilizing a polymer matrix and/or for increasing the durability thereof. The present invention also concerns a membrane such as an ion exchange membrane and in particular a proton exchange membrane thus stabilized, its method of preparation and uses thereof.

8 Claims, No Drawings

USE OF A FUNCTIONALIZED MINERAL FILLER FOR CHEMICALLY STABILIZING A POLYMER, MEMBRANE THUS STABILIZED, PROCESS FOR PREPARING SAME AND USES THEREOF

CROSS-REFERENCE TO RELATED APPLICATIONS

This application is a U.S. national phase under the provisions of 35 U.S.C. §371 of International Patent Application No. PCT/EP11/65239 filed Sep. 2, 2011, which in turn claims priority of French Patent Application No. 1057030 filed Sep. 3, 2010. The disclosures of such international patent application and French priority patent application are hereby incorporated herein by reference in their respective entireties, for all purposes.

TECHNICAL FIELD

The present invention belongs to the field of polymer matrices, in particular the field of membrane systems and, for some applications, to the field of renewable energies particularly fuel cells and more specifically fuel cells comprising a proton conducting membrane as electrolyte, such as PEMFC (Proton Exchange Membrane Fuel Cells).

More precisely, the present invention proposes stabilizers capable of improving the durability of polymer membranes and in particular polymer membranes sensitive to thermal, photochemical and chemical oxidation. Said polymer membranes can be used inter alia as ionic conductor.

The present invention therefore proposes firstly a method for chemically stabilizing of a polymer matrix, and secondly membranes such as proton conducting (or exchange) membranes having improved chemical stability thus prepared and fuel cell or electrolytic cell devices comprising such membranes.

STATE OF THE PRIOR ART

Proton Exchange Membrane Fuel Cells, PEMFCs, are current generators whose operating principle is based on the conversion of chemical energy to electrical energy via catalytic reaction of hydrogen and oxygen.

A fuel cell conventionally comprises a stack of elementary cells inside which the electrochemical reaction takes place between two reagents which are continuously added. The fuel such as hydrogen for fuel cells operating with hydrogen/oxygen mixtures (PEMFCs), is brought into contact with the anode, whereas the oxidizer, generally oxygen, is brought into contact with the cathode. The anode and cathode are separated by an electrolyte, of ion exchange membrane type. The electrochemical reaction, whose energy is converted to electrical energy, divides into two semi-reactions:

- oxidation of the fuel, which takes place at the anode/electrolyte interface and produces $H^+$ protons which will pass through the electrolyte in the direction of the cathode, and $e^-$ electrons which join up with the external circuit to contribute towards the production of electric energy;
- reduction of the oxidizer, taking place at the electrolyte/cathode interface and involving the protons which have passed through the membrane, to produce water and heat.

The electrochemical reaction occurs at an electrode-membrane-electrode assembly or membrane-electrode assembly (MEA) commonly called the « fuel cell core ».

This very thin assembly having a thickness of the order of one millimeter, even much thinner, is composed of a polymer membrane and of catalytic layers present on either side of the membrane. The membrane therefore allows the separation of the anode and cathode compartments. The catalytic layers are generally formed of platinum nanoparticles carried by carbon aggregates. Gaseous diffusion layers such as carbon fabric, felt . . . are arranged either side of the MEA to ensure electrical conduction, homogeneous input of the reagent gases and evacuation of the water produced. In addition, each electrode is supplied with fuel and oxidizer gases, for example by means of a splined plate called a « bipolar plate».

The thickness of the membrane is generally between 2 and 300 µm and in particular between 3 and 200 µm, and results from a compromise between mechanical resistance and ohmic drop. The polymer which forms this membrane must therefore be able to yield thin films, from 10 to 150 µm and in particular less than 50 µm that are dense and defect-free. In addition, this membrane allows separating of the gases. The chemical and electrochemical strength of these membranes generally allows fuel cell operation over time periods of more than 1 000 hours.

The membrane must therefore meet a certain number of conditions relating to its mechanical, physicochemical and electric properties which inter alia are those defined below. The mechanical properties, elastic modulus, yield strength, ductility, must make it compatible with assembly operations which for example include clamping between metal frames.

The properties must be maintained when changing from the dry state to the wet state.

The membrane must have good thermal stability during hydrolysis and display good resistance to reduction and oxidation. This thermomechanical stability is assessed in terms of variation in ionic strength, and in terms of variation in mechanical properties.

Finally, the membrane must have strong ion conductivity, this conductivity being provided by acid groups such as carboxylic acid, phosphonic acid or sulfonic acid groups linked to the polymer chain forming the membrane of proton exchange membrane type.

At the current time, different strategies have been proposed to improve the durability of membranes in terms of chemical and/or thermal stability, without affecting the other properties thereof. This chemical stability most particularly entails stability against oxidation. The HO. and HOO. radicals and hydrogen peroxide are often considered to be responsible for degradation of proton exchange membranes.

Some strategies concern the constituent polymer of the membrane, whereas others use the dispersing in the membranes of catalysts which trap the hydrogen peroxide/free radicals, such as manganese oxide catalysts or oxidation stabilizers.

For example, Zhao et al. 2010, to increase the durability of Nafion® membranes, proposed using nanocomposites of $MnO_2/SiO_2$ functionalized by a group carrying a sulfonic acid group ($—SO_3H$), whose precursor is 1,4-butanesultone [1]. As a variant, Rhee et al. 2006 used $—SO_3H$ groups grafted on nanofoils of titanate using as precursor of $—SO_3H$ groups, either thiol groups ($—SH$) which are then oxidized to $—SO_3H$ groups, or 1,4-butanesultone or 1,3-propanesultone [2].

The most frequently used oxidation stabilizers are amines, called HAS (for Hindered Amine Stabilizers) and hindered phenols. For this purpose Gensler et al., 2000 examined the influence of phenolic antioxidants and of two HASs marketed by Ciba Specialty Chemicals Inc. (FIG. 2) on the thermo-oxidative degradation of isotactic polypropylene [3].

It is to be pointed out however that Mikhailenko et al., 2009 modified membranes made in sulfonated polyether ether ketone (sPEEK) with a polyphenolic free radical scavenger i.e. catechin [4]. Surprisingly, it was shown that the membranes thus modified exhibited lower chemical stability, reduced conductivity and deteriorated performance level. More particularly, Mikhailenko et al., 2009 showed that conventional stabilizers of hindered phenol type are not efficient after a condensation reaction between phenols and sulfonic acids. In addition to the lack of stabilization, this condensation reaction translates as the disappearance of ionic functions and hence a drop in conductivity of the membrane. Through the teaching of Mikhailenko et al., 2009, those skilled in the art learn that not all conventional stabilizers can necessarily be used for the chemical stabilization of a proton exchange membrane in a fuel cell application.

The antioxidant activity of aminothiazoles has already been examined. De et al., 2008 worked on an analogue of dendrodoine, an alkaloid extracted from the marine tunicate *Dendrodoa grossularia* [5]. This analogue, corresponding to 4-amino-5-benzoyl-2-(4-methoxy phenylamino) thiazole, has exhibited a concentration-dependent antioxidant activity.

In the field of proton exchange membranes, Sen et al., 2008 used Nafion® membranes either swollen with a solution containing azoles such as 1H-1,2,4-triazole, 3-amino-1,2,4-triazole or 5-aminotetrazole, or cast from a solution containing Nafion® and said azoles [6]. The properties of the membranes thus obtained, in terms of thermal stability, permeability to methanol and conductivity were examined. Sen et al., 2008 appear to have observed better chemical stability but this was not demonstrated.

In addition, cerium dioxide ($CeO_2$) is known to display a faster reversible redox reaction ($Ce^{3+}$->$Ce^{4+}$+$e^-$). For example, Xiao et al., 2010 used nanoparticles of $CeO_2$ to prepare composite membranes composed of Nafion®212 combined with a layer of powdered Nafion® and in which nanoparticles $CeO_2$ were uniformly dispersed [7]. The chemical degradation of these membranes was examined.

It is therefore clearly apparent that different strategies have been envisaged or proposed to increase the chemical stability and hence the durability of proton exchange membranes. Surprisingly, the results obtained have shown that not all stabilizers can necessarily be used for this purpose.

The inventors have therefore set themselves the objective of developing stabilizers for proton exchange membranes with which it is not only possible to improve the chemical stability and hence the durability of these membranes but also to best improve all the properties of the membranes and thereby widen their fields of application.

DESCRIPTION OF THE INVENTION

To achieve the set objective, the inventors first examined the model compound representing the repeat unit of sPEEK. This compound, hereinafter designated compound M1, meets the following formula:

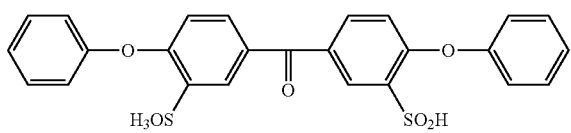

The study of this compound M1 showed that the degradation of sPEEK results from the adding of hydroxyl radicals onto the aromatic rings located either side of the ether bonds subsequent to the donor mesomer effect of the oxygen atom.

It was therefore envisaged that the replacing of the oxygen atoms by sulfur atoms should lead to a macromolecular structure less sensitive to oxidation. The compound thus obtained, hereinafter designated M2, meets the formula:

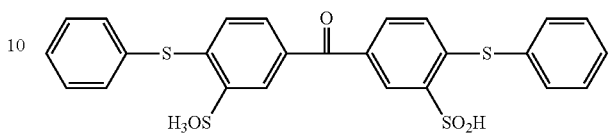

While sulfur also has a donor mesomer effect, it is most sensitive to oxidation. Yet, the inventors believed that its oxidation would lead to the formation of SO and then $SO_2$ thereby creating a structure having an acceptor mesomer effect which would strongly reduce the addition reactions on the aromatic rings. Unfortunately, the inventors have shown that while the oxidation of S to SO indeed takes place, the subsequent oxidation reaction does not lead to $SO_2$ but to chain-breaking. Finally, the inventors have shown that the oxidation of a mixture of M1+M2 preferably occurs on the compound M2.

The inventors therefore envisaged the use of this teaching to prepare sacrificial molecules acting as stabilizers for proton exchange membranes. It is to be recalled that, to play this role, these molecules must pay heed to several conditions which are:
  to be more easily oxidizable than the polymer matrix itself; this point is directly related to the work presented above and was verified using model compounds;
  not to be eluted by the water continuously generated in the fuel cell: these molecules are therefore grafted onto a support;
  to be located in regions in which the polymer matrix is most sensitive to degradation. These membranes being heterogeneous, they have hydrophobic and hydrophilic regions. However, since the polymer matrix is suspected to have strongest sensitivity in its hydrophilic region, these sacrificial molecules may come to be distributed over the entire polymer matrix or concentrated in the hydrophilic region thereof. Advantageously, these sacrificial molecules must be concentrated at said hydrophilic region.

The work by the inventors and the results obtained apply not only to proton exchange membranes but also to any ion exchange membrane and more generally to any membrane having a polymer matrix and to any polymer matrix which may be subjected to an oxidizing reaction. By « ion exchange membrane» is meant both an anionic membrane and a cationic membrane such as a proton exchange membrane.

First, the present invention concerns the use of at least one mineral filler functionalized by at least one group comprising at least one sulfur atom to chemically stabilize a polymer matrix and/or to increase the durability thereof.

Advantageously, said polymer matrix is included in a membrane such as an ion exchange membrane and in particular a cationic membrane or anionic membrane.

By « chemically stabilize» in the present invention is meant to make a polymer matrix and particularly a membrane such as an ion exchange membrane less sensitive to oxidation in the presence of the functionalized mineral filler, than without the presence thereof. The improvement in the chemical stability of a membrane, such as an ion exchange membrane, can be assessed by comparing the oxidation of the model compound representing the repeat unit of the polymer matrix, in particular of the membrane, with the oxidation of the functionalizing group. This comparison may entail subjecting a mixture containing this representative model compound and the functionalizing group to oxidizing conditions, then comparing the oxidation of the representative model compound with that of the functionalizing group, or comparing the oxidation of the representative model compound in the presence or absence of the functionalizing group.

As an example of protocol which can be followed regarding oxidizing conditions, a $1^{st}$ solution containing the representative model compound and a $2^{nd}$ solution containing the representative model compound (RMC) and the functionalizing group (FG) in a molar ratio of FG/RMC=0.1 are used. Hydrogen peroxide ($H_2O_2$) in solution is successively added to the solutions in the following molar ratio: $H_2O_2$/FG=0.5. The temperature of the solutions is held at 130° C. and the time between two additions of $H_2O_2$ is about 8 h±1 h) to allow complete $H_2O_2$-induced degradation between two successive degradation steps.

As regards the oxidation of the representative model compound, HPLC analysis is performed on Agilent 1100 Series apparatus (G1313A Sample Tray, Quaternary Pump G1311A and G1315B UV detector). The following experimental conditions are used: reverse phase column 300 SB-C18 (4.6-250 mm, 5 mm); composition of mobile phase: water with 5 mM ammonium acetate (solvent A) and acetonitrile (solvent B); flow rate of the mobile phase 1 ml/min; linear solvent gradient: 0-75 min 95-75% (solvent A). The mass spectra are obtained using a LC/MSD SL (G1956B) mass spectrometer equipped with an electrospray source to ionize the molecules. Data are analyzed using Agilent Chemstation software (version B.01.01). Phase separation is controlled by UV absorption at 295 and 254 nm and mass spectrum detection. The above-mentioned wavelengths are characteristic for all products whether or not oxidized and allow efficient quantification of the degradation of the representative model compound.

The increase in durability of the polymer matrix and in particular of a membrane, such as an ion exchange membrane, can be assessed by comparing the durability of the polymer matrix and particularly the membrane such as an ion exchange membrane containing a functionalized filler according to the invention with that of the same membrane not containing any functionalized mineral filler.

Therefore and in other words, the present invention concerns a method for chemically stabilizing a polymer matrix or membrane such as an ion exchange membrane and/or for increasing the durability thereof by dispersing, in all or part of the polymer matrix or in all or part of the polymer matrix of this membrane, a mineral filler functionalized by a functionalizing group such as defined in the present invention.

Any polymer matrix known to persons skilled in the art can be used in the present invention. Advantageously, by «polymer matrix» is meant the basic part of a membrane such as an ion exchange membrane, and in particular a proton exchange membrane, this matrix imparting shape to the membrane.

Therefore, any basic polymer matrix can be used in the present invention. In particular any basic polymer matrix usually used in the field of fuel cells and electrolytic cells can be given use in the present invention. In particular, this polymer matrix may be a matrix in a polymer chosen from among polyarylenes, polysulfones, polyimides, polybenzimidazoles, polyurethanes, polyolefins, polycarbonates, polyethyleneterephtalates, polyaryleneethers, these polymers advantageously being fluorinated even perfluorinated and/or sulfonated.

Advantageously the polymer matrix can be chosen from among matrixes in fluorinated and/or sulfonated polymer such as vinylidene polyfluoride, the copolymers of tetrafluoroethylene and tetrafluoropropylene (known under the abbreviation «FEP»), the copolymers of ethylene and tetrafluoroethylene (known under the abbreviation «ETFE»), the copolymers of hexafluoropropene and vinylidene fluoride (known under the abbreviation «HFP-co-VDF»), of vinylidene fluoride and trifluoroethylene (known under the abbreviation «VDF-co-TrFE»), of vinylidene fluoride, trifluoroethylene and monochlorotrifluoroethylene (known under the abbreviation «VDF-co-TrFE-co-chloroTrFE»), phenylene polysulfides, sulfonated polyaryleneethers and perfluorinated polymers containing sulfonic or carboxylic functional ionic groups such as the Nafion® polymers marketed by DuPont®.

Polymer matrices containing fluorinated polymers are advantageous in that they are corrosion-resistant, have good mechanical properties and low gas permeation. They are therefore particularly suitable for forming membranes of fuel cells.

However it is to be noted that, having regard to the substantial sensitivity to oxidation of the group(s) functionalizing the mineral filler, polymer matrices usually of little or no interest for fuel cell applications can be used in the present invention. Said matrices are particularly polymer matrices of sPEEK type, the latter being known for their very short durability in fuel cells.

The mineral filler used in the present invention is chiefly used as support for the group stabilizing the polymer matrix or the ion exchange membrane and allows the prevented elution thereof in the water continuously generated in the fuel cell as previously explained. It may additionally provide the polymer matrix or membrane, such as an ion exchange membrane, with other properties such as mechanical strength or thermal stability. In other words, the mineral filler forms (1) a support for the stabilizing groups to limit or prevent their elution, (2) an element reinforcing and/or nanostructuring the membrane and (3) an amplifier amplifying the efficacy of the stabilizing groups.

The mineral filler used in the present invention is in particle form. These particles can be of spherical shape or any other shape, and have monodisperse or polydisperse size distribution. Advantageously, the particles used in the present invention are particles of nanometric size: the term «nanoparticles» can therefore be used. These particles therefore have a characteristic size of between 1 nm and 1000 nm, in particular between 2 nm and 500 nm and more particularly between 3 nm and 100 nm. In one particular embodiment, these particles have a characteristic size of less than 100 nm, in particular when the mineral filler is in silica.

The use of (nano)particles allows good dispersion in the proton exchange membrane and optionally good localized dispersion at defined regions of the proton exchange membrane such as the hydrophilic region thereof. The (nano) particles envisaged in the present invention can be used in the same way as the $CeO_2$ nanoparticles described in Xiao et al., 2010 [7].

The mineral filler used in the present invention may be in metal, metal oxide, metalloid, metalloid oxide, silicate, clay or one of the mixtures thereof. By «metal» and «metal oxide» in the present invention is meant an element and an oxide of an element chosen from groups 3, 13 and 14 in the Periodic Table. Advantageously the mineral filler used in the present invention is in silica (i.e. silicon dioxide), montmorillonite, cerium oxide, titanium, titanium oxide, manganese, manganese oxide, zirconium, zirconium oxide, silver, gold, iron, platinum or one of the mixtures thereof.

In the present invention, this mineral filler is functionalized by a group capable of chemically stabilizing the polymer matrix and in particular the membrane, e.g. an ion exchange membrane. As previously explained, this group has a sacrificial role. In other words, it oxidizes faster than the polymer matrix and the polymer matrix of the membrane e.g. an ion exchange membrane in particular a proton exchange membrane, and on this account allows the latter to be scarcely or not affected by the oxidizing conditions such as the HO. and HOO. free radicals and hydrogen peroxide that are present during the operation of a fuel cell. In the remainder hereof the group functionalizing the mineral filler will be called the « functionalizing group».

Advantageously, the mineral filler used in the present invention comprises several identical or different functionalizing groups. Therefore, the expression « the functionalizing group» herein is equivalent to the expression « the functionalizing groups».

The group implemented in the present invention functionalizes the mineral filler such as previously defined. This means that this group is bonded or grafted, directly or indirectly, to this mineral filler via at least one covalent bond.

This covalent bond, when it is direct, involves an atom of the mineral filler and an atom of the functionalizing group. On the contrary, when it is indirect, a spacer arm separates the mineral filler and the functionalizing group and is covalently bonded first to the mineral filler and secondly to the functionalizing group. By « spacer arm» in the present invention is meant an atom or several atoms which do not belong either to the mineral filler or to the functionalizing group and which is (are) a result of the method and/or graft used to functionalize the mineral filler. The spacer arm advantageously comprises a silicon atom.

As a variant, the bond between the mineral filler and the functionalizing group may involve more than one covalent bond when it is direct or more than two covalent bonds when it is indirect. As a further variant, the functionalizing group may form a bridging group between at least two atoms of the mineral filler.

Advantageously, the functionalizing group is a hydrophilic group or a group soluble in a hydrophilic solvent. By « group soluble in a hydrophilic solvent» in the meaning of the present invention is meant an advantageously polar chemical function which is fully dissolved at a concentration of 5 weight % or higher and at ambient temperature in a hydrophilic solvent.

The group functionalizing the mineral filler such as previously defined comprises at least one sulfur atom. In one particular embodiment, the functionalizing group comprises at least two sulfur atoms when it carries a sulfonic acid function.

Advantageously, the functionalizing group comprises 1 to 40 carbon atoms, in particular 2 to 30 carbon atoms and more particularly 3 to 20 carbon atoms.

In a $1^{st}$ embodiment, the functionalizing group comprises a single sulfur atom and preferably does not have any sulfonic acid function. This sulfur atom is advantageously in the form of a thioester (—S—), thiol (—SH), thiocarbonyl (—C(=S)—), sulfonyl (—S(=O)$_2$—) or sulfinyl (—S(=O)—) and in particular in the form of a thiol (—SH) or, as a variant, in the form of a thiocarbonyl (—C(=S)—). Therefore, the functionalizing group may be a (hetero)alkyl group substituted at least by a thiol function; a (hetero)alkyl group interrupted by a thiocarbonyl and optionally substituted; a (hetero)aryl group substituted at least by a thiol; a (hetero)aryl group interrupted by a thiocarbonyl and optionally substituted; a thiocarbonyl separating an optionally substituted (hetero)alkylene and an optionally substituted (hetero)aryl; or a thiocarbonyl separating an optionally substituted (hetero)arylene and an optionally substituted (hetero)alkyl.

In a $2^{nd}$ embodiment, the functionalizing group comprises at least two sulfur atoms. These two sulfur atoms may lie on the main straight chain of the functionalizing group, on side chains substituting for this main chain, or one on the main chain and the other one on a substituting side chain.

In this embodiment, it is obvious that the functionalizing group may comprise other sulfur atoms in addition to the two aforementioned. For example the functionalizing group may comprise from one sulfur atom ($1^{st}$ embodiment) to 10 sulfur atoms and in particular 1, 2, 3, 4, 5, 6 or 7 sulfur atoms.

In this $2^{nd}$ embodiment, each sulfur atom may be in the form of —S—, —SH, —C(=S)—, —S(=O)$_2$—, —(=O)—, —S((=O)$_2$)O$^-$ or —S((=O)$_2$)OH. As examples of this $2^{nd}$ embodiment, one of the two sulfur atoms is in the form of —S— or —C(=S)—, and the other sulfur atom or atoms are in the form of —SH, —S(=O)$_2$—, —S(=O)—, —S((=O)$_2$)O$^-$ and/or —S((=O)$_2$)OH. As more particular examples, the two sulfur atoms are in the form of —S— and —SH; —S— and —S((=O)$_2$)OH; —C(=S)— and —SH or —C(=S)— and —S((=O)$_2$)OH. When one of the two sulfur atoms is in the form of —S— or —C(=S)—, the latter interrupt a (hetero)alkyl group or a (hetero)aryl group in the functionalizing group, or separate a (hetero)alkylene group and a (hetero)aryl group or a (hetero)arylene group and a (hetero)alkyl group.

As a variant of this $2^{nd}$ embodiment, these two sulfur atoms are present on the main chain of the functionalizing group. Therefore this functionalizing group meets the following formula (I):

—X—S—Y—S—Z     (I)

in which:
X is an optionally substituted alkylene group, an optionally substituted heteroalkylene group, an optionally substituted arylene group or an optionally substituted heteroarylene group;
Y is a covalent bond (i.e. a bond linking the two atoms of S in formula (I)), a disulfide group (—S—S— or disulfide bridge), an optionally substituted alkylene group, an optionally substituted heteroalkylene group, an optionally substituted arylene group or an optionally substituted heteroarylene group;
Z is an optionally substituted alkyl group, an optionally substituted heteroalkyl group, an optionally substituted aryl group or an optionally substituted heteroaryl group.

In the present invention by « alkyl group» or « alkylene group» is meant a straight-chained, branched or cyclic alkyl or alkylene group comprising 1 to 20 carbon atoms, in particular 1 to 15 carbon atoms and more particularly 1 to 10 carbon atoms.

In the present invention by « heteroalkyl group» or « heteroalkylene group» is meant a straight-chained, branched or cyclic heteroalkyl or heteroalkylene group comprising 1 to 20 carbon atoms, in particular 1 to 15 carbon atoms and more particularly 1 to 10 carbon atoms, the heteroatom(s) possibly being N, O, P, Si or S and particularly N, O, Si or S. The heteroatoms may in particular interrupt an alkyl or alkylene chain, separate an alkylene chain and an alkyl chain and/or separate two alkylene chains. In these two latter cases, the heteroatoms may be in the form of carboxyl or thiocarbonyl radicals.

In the present invention, by «aryl group» or «arylene group» is meant an aromatic carbon structure formed of one or more aromatic rings each comprising from 3 to 10 carbon atoms and in particular 3 to 8 carbon atoms.

In the present invention by «heteroaryl group» or «heteroarylene group» is meant a heteroaromatic carbon structure formed of one or more heteroaromatic rings each comprising from 3 to 10 carbon atoms, in particular 3 to 8 carbon atoms, the heteroatom(s) possibly being N, O, P, Si or S and in particular N, O, Si or S. The heteroatoms may in particular interrupt an aromatic ring and/or separate two aromatic rings of an aryl group or of an arylene group. In the latter case, the heteroatoms may be in the form of carboxyl or thiocarbonyl radicals.

In the present invention by «substituted (hetero)alkyl group», «substituted (hetero)alkylene group», «substituted (hetero)aryl group», » or «substituted (hetero)arylene group» is meant a (hetero)alkyl group, (hetero)alkylene group, (hetero)aryl group or (hetero)arylene group such as previously defined, mono- or polysubstituted by a group chosen from among a halogen; amine; diamine; carboxyl; carboxylate; aldehyde; ester; ether; hydroxyl; halogen; an optionally substituted (hetero)aryl such as previously defined and in particular such as a phenyl, benzyl or naphthyl; an optionally substituted (hetero)alkyl such as previously defined and in particular such as a methyl, ethyl, propyl or hydroxypropyl; an amine; amide; sulfonyl; sulfoxide; sulfonate; acyl; vinyl; hydroxyl; epoxy; phosphonate; sulfonic acid; isocyanate; thiol; glycidoxy; acryloxy and a group of general formula —SiR$_a$R$_b$R$_c$ in which R$_a$, R$_b$ and R$_c$, independently of each other, are chosen from the group consisting of a hydrogen; halogen; amine; diamine; amide; acyl; vinyl; hydroxyl; epoxy; phosphonate; sulfonic acid; isocyanate; carboxyl; thiol; glycidoxy; acryloxy such as a methacryloxy; an optionally substituted (hetero)alkyl such as previously defined; an optionally substituted (hetero)aryl group such has previously defined; an alkoxy group of formula —OR$_d$ wherein R$_d$ is an optionally substituted (hetero)alkyl group such as previously defined, and the salts thereof.

It is notably by means of these substitutions and in particular substitution by a group of general formula —SiR$_a$R$_b$R$_c$ that the functionalizing group is able to become bridging. A group of general formula —SiR$_a$R$_b$R$_c$ with at least one from among R$_a$, R$_b$ and R$_c$ representing an alkoxy group of formula —OR$_d$ can be used to graft the free end of the functionalizing group onto the mineral filler using a process such as silanization.

Among the different functionalizing groups, as particular examples thereof functionalizing groups can be cited comprising a thiol group; disulfide group; tetrasulfide group and thiourea group.

As more particular examples, a functionalizing group can be cited meeting one of the formulas below:

  (II);

  (III);

  (IV);

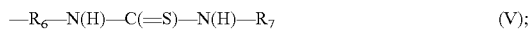  (V);

  (VI);

the radicals R$_1$, R$_2$, R$_4$, R$_6$ and R$_8$ representing an optionally substituted (hetero)alkylene or an optionally substituted (hetero)arylene such as previously defined and the radicals R$_3$, R$_5$, R$_7$ and R$_9$ representing an optionally substituted (hetero)alkyl or optionally substituted (hetero)aryl such as previously defined.

Among the functionalizing groups having formula —R$_1$—SH (II), mention can be made of those in which R$_1$ represents an optionally substituted (hetero)alkylene such as previously defined, in particular an optionally substituted alkylene such as previously defined and particularly a methylene, ethylene, propylene or butylene.

Among the functionalizing groups having formula —R$_2$—SS—R$_3$ (III), mention can be made of those in which R$_2$ represents an optionally substituted (hetero)alkylene such as previously defined, in particular an optionally substituted alkylene such as previously defined, particularly a methylene, ethylene, propylene or butylene and more particularly a propylene and in which R$_3$ represents an optionally substituted (hetero)alkyl such as previously defined, in particular an optionally substituted alkyl such as previously defined and particularly an optionally substituted methyl, an optionally substituted ethyl, an optionally substituted propyl or an optionally substituted butyl and more particularly a propyl substituted by a sulfonic acid group. Said functionalizing group is therefore of formula —(CH$_2$)$_3$—S—S—(CH$_2$)$_3$—SO$_3$H.

Among the functionalizing groups having formula —R$_4$—SSSS—R$_5$ (IV), mention can be made of those in which R$_4$ represents an optionally substituted (hetero)alkylene such as previously defined, in particular an optionally substituted alkylene such as previously defined and particularly a methylene, ethylene, propylene or butylene and more particularly a propylene and in which R$_5$ represents an optionally substituted (hetero)alkyl such as previously defined, in particular an optionally substituted alkyl such as previously defined, particularly an optionally substituted methyl, optionally substituted ethyl, optionally substituted propyl or optionally substituted butyl and more particularly a propyl substituted by a group of formula —SiR$_a$R$_b$R$_c$ such as previously defined. Examples of such functionalizing groups are of formula:

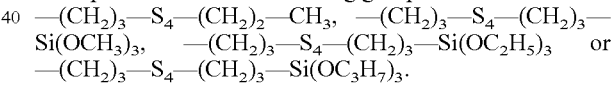

Among the functionalizing groups having formula —R$_6$—N(H)—C(=S)—N(H)—R$_7$ (V), mention can be made of those in which R$_6$ represents an optionally substituted (hetero)alkylene such as previously defined, in particular an optionally substituted alkylene such as previously defined, particularly a methylene, ethylene, propylene or butylene and more particularly a propylene and in which R$_7$ represents an optionally substituted (hetero)aryl such as previously defined, in particular an optionally substituted aryl such as previously defined, particularly an optionally substituted phenyl and more particularly a phenyl optionally substituted by a sulfonic acid group. Examples of such functionalizing groups have the formula —(CH$_2$)$_3$—N(H)—C(=S)—N(H)—C$_6$H$_5$ or —(CH$_2$)$_3$—N(H)—C(=S)—N(H)—C$_6$H$_4$—SO$_3$H.

Among the functionalizing groups having formula —R$_8$—S—R$_9$, mention can be made of those in which R$_8$ represents an optionally substituted (hetero)alkylene such as previously defined, in particular an optionally substituted alkylene such as previously defined and particularly a methylene, ethylene, propylene or butylene and in which R$_9$ represents an optionally substituted (hetero)alkyl such as previously defined, in particular an optionally substituted alkyl such as previously defined, particularly an optionally substituted methyl, optionally substituted ethyl, optionally substituted propyl or optionally substituted butyl and more particularly a propyl substituted by a sulfonic acid group.

In the present invention, it is to be pointed out that the sulfonated functionalizing groups (i.e. having a sulfonic acid group) allow an improvement not only in the durability of the membrane and in particular a proton exchange membrane, but also in its conducting properties by increasing the ion exchange capability thereof, which is a function of the number of ion groups per gram of polymer. Other characteristic functions either of anionic membranes such as quaternary ammonium groups, or of cationic membranes such as acid groups, may also be used to substitute the functionalizing group and thereby participate in the conducting properties of an anionic membrane or cationic membrane.

The present invention also concerns a membrane, such as an ion exchange membrane and in particular a proton exchange membrane, comprising a polymer matrix and at least one mineral filler functionalized by at least one functionalizing group such as previously defined. The membrane, such as an ion exchange membrane and in particular a proton exchange membrane according to the present invention is therefore a composite membrane.

More particularly, the present invention concerns a membrane, such as an ion exchange membrane and in particular a proton exchange membrane, comprising a polymer matrix, particularly such as defined, and at least one mineral filler in particular such as defined functionalized by at least one group containing a single sulfur atom in the form of a thioester (—S—), thiocarbonyl (—C(=S)—) or sulfinyl (—(=O)—).

As a variant, the present invention concerns a membrane such as an ion exchange membrane and in particular a proton exchange membrane, comprising a polymer matrix, in particular such as previously defined, and at least one mineral filler in particular such as previously defined, functionalized by at least one group comprising at least two sulfur atoms such as previously defined.

The present invention also concerns a method for preparing a membrane such as an ion exchange membrane and in particular a proton exchange membrane according to the present invention comprising the steps of:

a) preparing a mineral filler functionalized by a group comprising at least one sulfur atom, such as defined for the membranes of the invention;

b) combining the functionalized mineral filler prepared at step (a) with a polymer matrix in particular such as previously defined, after which said membrane, such as an ion exchange membrane or proton exchange membrane is obtained.

It is to be noted that the method for chemically stabilizing a polymer matrix or a membrane, such as an ion exchange membrane and/or to increase the durability thereof according to the present invention also comprises the steps (a) and (b) such as defined above. However, at step (a), there is no limitation as to the groups comprising at least one sulfur atom which can be used for the stabilization method, contrary to the method for preparing a membrane in which the groups comprising at least one sulfur atom are limited to the groups envisaged for the membranes of the invention.

Different variants can be envisaged for step (a) of the method according to the invention.

In a 1st variant, this step (a) entails the functionalization of a pre-existing mineral filler, the latter being commercially available or able to be prepared beforehand. It may be necessary to subject this mineral filler to pre-treatment prior to this functionalization. As an illustrative but non-limiting example, mention can be made of an oxidizing treatment. By « oxidizing treatment » in the present invention is meant pre-treatment intended to oxidize the surface of the mineral filler used and/or to prepare this surface for later oxidation through the formation of radicals. Oxidation modifies the surface of the mineral filler in particular by fixing thereunto and/or adding thereto groups having high oxygen content such as groups of hydroxyl (—OH) or silanol (—SiOH) type.

In a 2nd variant, the preparation of the mineral filler and its functionalization are conducted in a single step. This variant can use a process of sol-gel type using one or more derivative compounds of silane, of which at least one has a functionalizing group such as defined in the present invention. With said process it is possible in particular to prepare a silica particle functionalized by a functionalizing group such as defined in the present invention. The derivative compound of silane having a functionalizing group corresponds to a precursor of the functionalizing group and to a graft according to the present invention.

Irrespective of the envisaged variant, it may use a derivative compound of silane having the general formula $SiR_a R_b R_c R_e$ in which the radicals $R_a$, $R_b$ and $R_c$ are such as previously defined and the radical $R_e$ is a functionalizing group according to the present invention.

Among the radicals $R_a$, $R_b$ and $R_c$ such as previously defined, particular mention can be made of an optionally substituted (hetero)alkyl such as previously defined; an optionally substituted (hetero)aryl such as previously defined and an alkoxy group of formula —$OR_d$ with $R_d$ representing an optionally substituted (hetero)alkyl group such as previously defined and in particular an alkoxy group of formula —$OR_d$. The radicals $R_a$, $R_b$ and $R_c$ may be the same or different. Advantageously, the radicals $R_a$, $R_b$ and $R_c$ are the same. More advantageously, the radicals $R_a$, $R_b$ and $R_c$ are methoxy, ethoxy or propoxy radicals.

The molecules below form derivative compounds of silane which can be used in the present invention:

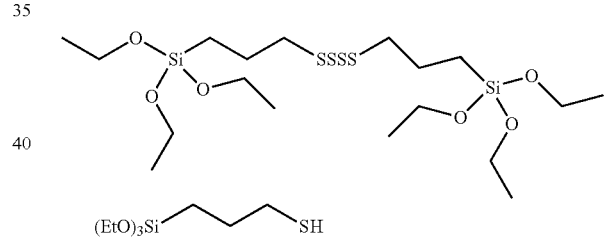

it only being possible to use the latter in the method for stabilizing a polymer matrix or membrane,

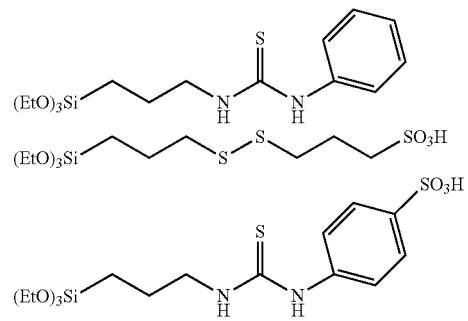

Functionalization methods using derivative compounds of silane are well known to one skilled in the art (see for example [1] and [2]). The one skilled in the art will know how to determine operating conditions in relation to the mineral filler or graft used.

Different variants can be envisaged for step (b) of the method of the invention.

In a 1$^{st}$ variant, this step (b) may entail combining a pre-existing polymer matrix, this being commercially available or able to be prepared beforehand. In this variant, the functionalized mineral filler is placed in solution in a swelling solution capable of swelling the polymer matrix. The choice of this swelling solution is made taking into account the type of polymer matrix and the type of functionalized mineral filler, in particular so that it has relatively stable and homogeneous dispersibility in this swelling solution.

In a 2$^{nd}$ variant, this step (b) may consist in combining the polymer matrix with the mineral filler at the time when this polymer matrix is produced or synthesized. In this variant, the mineral filler and the precursor(s) of the polymer matrix are mixed together.

Once step (b) is completed, irrespective of the envisaged variant, the functionalized mineral filler comes to be dispersed in or coated with the polymer matrix.

The teaching of Xiao et al., 2010 [7] can also be used to prepare an exchange membrane such as an ion exchange membrane or proton membrane in which the functionalized mineral fillers are concentrated at predetermined regions of the polymer matrix such as the hydrophilic region of the proton exchange membrane.

The present invention also concerns a membrane and in particular a proton exchange membrane such as defined herein or able to be prepared using a method such as defined herein, in a fuel cell device or electrolyzer.

The present invention therefore concerns a fuel cell device with proton exchange membrane comprising at least one membrane and in particular at least one proton exchange membrane according to the present invention or able to pre-pared using a method of the present invention.

Advantageously, the fuel cell device of the present invention comprises:
- a fuel source, in liquid or gas form, which supplies hydrogen to the anode, this fuel source possibly being crude hydrogen (i.e. having impurities), pure or purified hydrogen, a mixture containing hydrogen and at least one inert gas;
- an anode coated with a catalyst at which the hydrogen is oxidized;
- an oxidizer source in liquid or gas form, which supplies oxidizer to the cathode, this oxidizer source possibly being pure or purified oxygen, air or a mixture containing oxygen and at least one inert gas;
- a cathode at which the oxidizer is reduced and which is electrically connected to the anode via an electric conductor; and
- a membrane and in particular a proton exchange membrane according to the invention which corresponds to the electrolyte acting as ion conductor between the anode and cathode.

To prepare said device, the membrane of the present invention is placed between two electrodes, for example in carbon fabric optionally platinum-coated. The assembly is pressed by heating. This assembly is then inserted between two plates (e.g. in graphite called bipolar plates which ensure distribution of the gases and electric conductivity).

The present invention also concerns an electrolyzer comprising at least one membrane according to the present invention or able to be prepared using a method of the present invention. Said electrolyzer may be a membrane electrolyzer or a proton exchange membrane electrolyzer such as an electrolyzer of PEM-WE type (for Proton Exchange Membrane Water Electrolyzer) converting electric energy to chemical energy.

The membrane of the present invention can also be used in electrodialysis and in particular for the treatment of industrial or household waste.

Other characteristics and advantages of the present invention will become further apparent to the one skilled in the art on reading the examples given below for illustration purposes and which are non-limiting.

DETAILED DESCRIPTION OF PARTICULAR EMBODIMENTS

I. Grafts Used.

The two following grafts were used:
- a commercial graft (hereinafter called « graft A» ) corresponding to the tetrasulfide of Bis[3-(triethoxysilyl)propyl] (ref. 15200 Aldrich) having the formula:

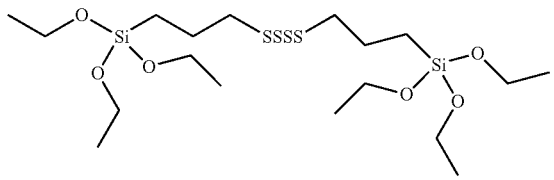

- a synthesized graft [8] (hereinafter called « graft B» ) corresponding to triethoxysilane substituted by phenylthiourea and of formula:

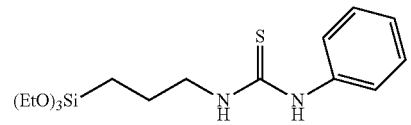

II. Grafting and Membrane Preparation Protocols

Two hundred and fifty μL of graft A or 306 mg of graft B were dissolved in 10 ml of N-methyl-2-pyrrolidone (NMP). To this solution was added 1 ml of silica colloidal solution, Ludox HS-30 (ref. 420824 Aldrich).

The mixture was heated to 80° C. for 24 h, before being purified by dialysis thereby allowing the removal of non-grafted reagent.

The polymer e.g. sPEEK or Nafion® in powder form was dissolved in a suitable solvent. The solution thus obtained was dispersed in the solution of grafted silica.

The membrane was obtained from the solution containing the polymer and grafted silica by solution-casting and evaporation.

III. Efficacy of the Membrane Containing a Polymer and Silica Grafted with a Derivative of Grafts A or B, as Stabilizer.

The efficacy of these stabilizers was verified by precise measurement of the degradation kinetics of a model molecule in a hydrogen peroxide solution (protocol representing chemical ageing in a fuel cell) with or without the presence of the stabilizer.

The protocols used conform to the protocols described in the foregoing for oxidizing conditions and for oxidation of the representative model compound.

A representative model molecule of a sPEEK polymer matrix (compound M1 such as previously defined) was chosen for this study, sPEEK membranes being known for their very high sensitivity to the hydroxyl radicals produced in a fuel cell. It was observed that the degradation rate of this model molecule was reduced by a factor of two in the presence of the stabilizer and with both of the aforementioned grafts.

REFERENCES

[1] Zhao et al., 2010, « $MnO_2/SiO_2$—$SO_3H$ nanocomposite as hydrogen peroxide scavenger for durability improvement in proton exchange membranes », Journal of Membrane Science, vol. °346, pages 143-151.

[2] Rhee et al., 2006, « Nanocomposite membranes of surface-sulfonated titanate and Nafion® for direct methanol fuel cells », Journal of Power Sources, vol. °159, pages 1015-1024.

[3] Gensler et al., 2000, « Thermo-oxidative degradation of isotactic polypropylene at high temperatures: phenolic antioxidants versus HAS », Polymer Degradation and Stability, vol °67, pages 195-208.

[4] Mikhailenko et al., 2009, « Properties of SPEEK based membranes modified with a free radical scavenger », Journal of Membrane Science, vol. °345, pages 315-322.

[5] De et al., 2008, « Antioxidant activity of an aminothiazole compound: Possible mechanisms », Chemico-Biological Interactions, vol. °173, pages 215-223.

[6] Sen et al., 2008, « Anhydrous proton conducting membranes for PEM fuel cells based on Nafion/Azole composites », International Journal of Hydrogen Energy, vol. 33, pages 2808-2815.

[7] Xiao et al., 2010, « Degradation location study of proton exchange membrane at open circuit operation », Journal of Power Sources, vol 195, pages 5305-5311.

[8] Angelova et al., 2004, « Sol-gel synthesis of Zn-thiourea-$SiO_2$ thin films from $(EtO)_3Si(CH_2)_3NHC(=S)NHPh$ as molecular precursor », Solid State Sciences, vol. 6, pages 1287-1294.

The invention claimed is:

1. Method for preparing a membrane comprising a polymer matrix and at least one mineral filler functionalized by at least one group comprising a single sulfur atom in the form of a thioester (—S—), thiocarbonyl (—C(=S)—) or sulfinyl (—S(=O)—), said method comprising the steps of:
   a) preparing a mineral filler functionalized by at least one group comprising a single sulfur atom in the form of a thioester (—S—), thiocarbonyl (—C(=S)—) or sulfinyl (—S(=O)—), by using a compound derived from silane of general formula $SiR_aR_bR_cR_e$ wherein:
   the radicals $R_a$, $R_b$ and $R_c$, independently of each other, are chosen from the group consisting of a hydrogen; halogen; amine; diamine; amide; acyl; vinyl; hydroxyl; epoxy; phosphonate; sulfonic acid; isocyanate; carboxyl; thiol; glycidoxy; acryloxy; an optionally substituted (hetero)alkyl; an optionally substituted (hetero) aryl group; an alkoxy group of formula —$OR_d$ with $R_d$ representing an optionally substituted (hetero)alkyl group and the salts thereof; and
   the radical $R_e$ is a functionalizing group comprising a single sulfur atom in the form of a thioester (—S—), thiocarbonyl (—C(=S)—) or sulfinyl (—S(=O)—); and
   b) combining the functionalized mineral filler prepared at step (a) with a polymer matrix whereby said membrane is obtained.

2. The method according to claim 1, wherein the derivative compound of silane meets the formula:

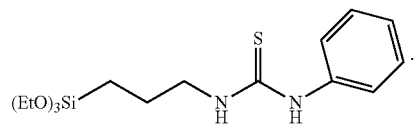

3. Method for preparing a membrane comprising a polymer matrix and at least one mineral filler functionalized by at least one group comprising at least two sulfur atoms, said method comprising the steps of:
   a) preparing a mineral filler functionalized by at least one group comprising at least two sulfur atoms, by using a compound derived from silane of general formula $SiR_aR_bR_cR_e$ wherein:
   the radicals $R_a$, $R_b$ and $R_c$, independently of each other, are chosen from the group consisting of a hydrogen; halogen; amine; diamine; amide; acyl; vinyl; hydroxyl; epoxy; phosphonate; sulfonic acid; isocyanate; carboxyl; thiol; glycidoxy; acryloxy; an optionally substituted (hetero)alkyl; an optionally substituted (hetero) aryl group; an alkoxy group of formula —$OR_d$ with $R_d$ representing an optionally substituted (hetero)alkyl group and the salts thereof; and
   the radical $R_e$ is a functionalizing group comprising at least two sulfur atoms; and
   b) combining the functionalized mineral filler prepared at step (a) with a polymer matrix whereby said membrane is obtained.

4. The method according to claim 3, wherein the derivative compound of silane meets one of these formulas:

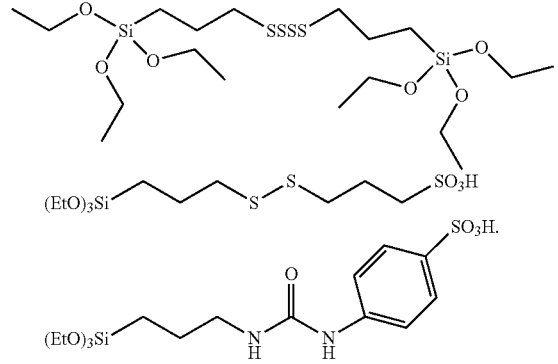

5. Fuel cell device comprising at least one membrane prepared using the method of claim 1.

6. Fuel cell device comprising at least one membrane prepared using the method of claim 3.

7. Electrolyzer comprising at least one membrane prepared using the method of claim 1.

8. Electrolyzer comprising at least one membrane prepared using the method of claim 3.

* * * * *

UNITED STATES PATENT AND TRADEMARK OFFICE
CERTIFICATE OF CORRECTION

PATENT NO. : 9,211,505 B2  Page 1 of 1
APPLICATION NO. : 13/819942
DATED : December 15, 2015
INVENTOR(S) : Gonon It is certified that error appears in the above-identified patent and that said Letters Patent is hereby corrected as shown below:

In the claims

Column 16, Claim 4, delete the third chemical formula:

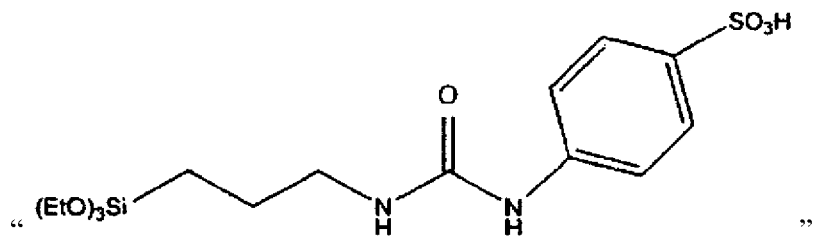

insert

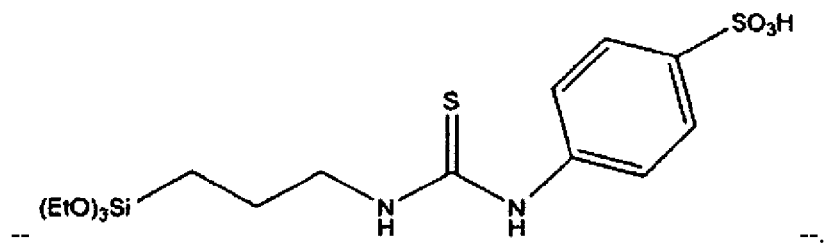

Signed and Sealed this
Twenty-sixth Day of April, 2016

Michelle K. Lee
*Director of the United States Patent and Trademark Office*